(12) United States Patent
Iskander et al.

(10) Patent No.: US 10,904,793 B2
(45) Date of Patent: Jan. 26, 2021

(54) SYSTEMS, METHODS AND DEVICES FOR UPLINK BEARER SPLIT USING WIRELESS LOCAL AREA NETWORK AGGREGATION

(71) Applicant: APPLE INC., Cupertino, CA (US)

(72) Inventors: Shadi Iskander, Unterhaching (DE); Nageen Himayat, Fremont, CA (US); Candy Yiu, Portland, OR (US); Alexander Sirotkin, Petach Tikva (IL); Jerome Parron, Fuerth (DE); Ofer Hareuveni, Haifa (IL); Umesh Phuyal, Beaverton, OR (US); Penny Efraim-Sagi, Kfar-Sava (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/067,685

(22) PCT Filed: Jun. 27, 2016

(86) PCT No.: PCT/US2016/039548
§ 371 (c)(1),
(2) Date: Jul. 2, 2018

(87) PCT Pub. No.: WO2017/164901
PCT Pub. Date: Sep. 28, 2017

(65) Prior Publication Data
US 2019/0021026 A1    Jan. 17, 2019

Related U.S. Application Data

(60) Provisional application No. 62/312,337, filed on Mar. 23, 2016.

(51) Int. Cl.
*H04W 28/08* (2009.01)
*H04W 76/16* (2018.01)
(Continued)

(52) U.S. Cl.
CPC ..... *H04W 28/085* (2013.01); *H04W 28/0278* (2013.01); *H04W 28/06* (2013.01);
(Continued)

(58) Field of Classification Search
CPC ............... H04W 28/085; H04W 76/16; H04W 28/0278; H04W 28/06; H04W 88/06;
(Continued)

(56) References Cited

U.S. PATENT DOCUMENTS

2013/0343296 A1* 12/2013 Dinan ............... H04W 72/0413
370/329
2015/0085800 A1*  3/2015 Sivanesan ............. H04W 76/27
370/329
(Continued)

FOREIGN PATENT DOCUMENTS

EP    2854444 A1 *  4/2015  ........ H04W 72/0413
EP    2854444 A1     4/2015
(Continued)

OTHER PUBLICATIONS

PCT/US2016/039548, International Search Report and Written Opinion, dated Nov. 28, 2016, 14 pages.

*Primary Examiner* — Hardikkumar D Patel
(74) *Attorney, Agent, or Firm* — Stoel Rives LLP

(57) ABSTRACT

Uplink (UL) data splits between LTE and WLAN can be go supported in cellular networks. The split can be UE controlled or network controlled. Both UE and network controlled bearer split architectures can be supported. The reporting of Uplink Buffer Status (BSR) and the subsequent data allocation can depend on what option is supported by the network. For UE controlled UL data splits, the UE determines a traffic split ratio between LTE and WLAN. The split can be based on local link conditions. For network controlled UL data splits, the network (e.g. a Link Aggre-
(Continued)

gation Scheduler at the eNB) is responsible for making bearer split decisions. The decisions can be based on link qualities, available traffic and quality of service (QoS) requirements of associated users. The split can be based on a per bearer threshold, an eNB configured ratio, or an implicit inference based on a UL grant.

21 Claims, 5 Drawing Sheets

(51) Int. Cl.
    *H04W 28/02*     (2009.01)
    *H04W 28/06*     (2009.01)
    *H04W 88/06*     (2009.01)
    *H04W 80/08*     (2009.01)
    *H04W 84/12*     (2009.01)

(52) U.S. Cl.
    CPC .......... *H04W 76/16* (2018.02); *H04W 88/06* (2013.01); *H04W 80/08* (2013.01); *H04W 84/12* (2013.01)

(58) Field of Classification Search
    CPC ..... H04W 80/08; H04W 84/12; H04W 16/14; H04W 8/08; H04W 28/08; H04W 76/15; H04W 88/10; H04W 88/16; H04W 72/04; H04W 72/12; H04W 88/08; H04W 72/1242; H04W 76/026; H04W 72/0413; H04W 28/02; H04W 16/32; H04W 36/00; H04W 12/04; H04W 36/0033; H04W 36/0055; H04W 28/20; H04W 74/0825; H04L 29/08; H04L 69/324; H04L 69/14; H04L 5/0037; H04L 1/02; H04L 1/0003; H04B 7/212

See application file for complete search history.

(56) References Cited

U.S. PATENT DOCUMENTS

2016/0255537 A1*   9/2016   Uchino ............ H04W 28/0278
                                                    370/329
2019/0014498 A1*   1/2019   Gao ...................... H04W 88/06

FOREIGN PATENT DOCUMENTS

| EP | 3079439 A1 | 4/2015 |
| WO | 2015059055 A2 | 4/2015 |
| WO | 2015115205 A1 | 8/2015 |

* cited by examiner

SYSTEMS, METHODS AND DEVICES FOR UPLINK BEARER SPLIT USING WIRELESS LOCAL AREA NETWORK AGGREGATION

RELATED APPLICATION

This application is a national stage filing under U.S.C. § 371 of International Patent Application No. PCT/US2016/039548, filed Jun. 27, 2016, which claims the benefit under 35 U.S.C. § 119(e) of U.S. Provisional Application No. 62/312,337 filed Mar. 23, 2016, each of which is incorporated by reference herein in its entirety.

TECHNICAL FIELD

The present disclosure relates to cellular networks, and more specifically to an uplink bearer split using wireless local area network aggregation.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN 104 implements GSM and/or EDGE RAT, the UTRAN 106 implements universal mobile telecommunication system (UMTS) RAT or other 3GPP RAT, and the E-UTRAN 108 implements LTE RAT.

A core network can be connected to the UE through the RAN Node. The core network can include a serving gateway (SGW), a packet data network (PDN), gateway (PGW), an access network detection and selection function (ANDSF) server, an enhanced packet data gateway (ePDG) and/or a mobility management entity (MME).

DETAILED DESCRIPTION

Figure 1:
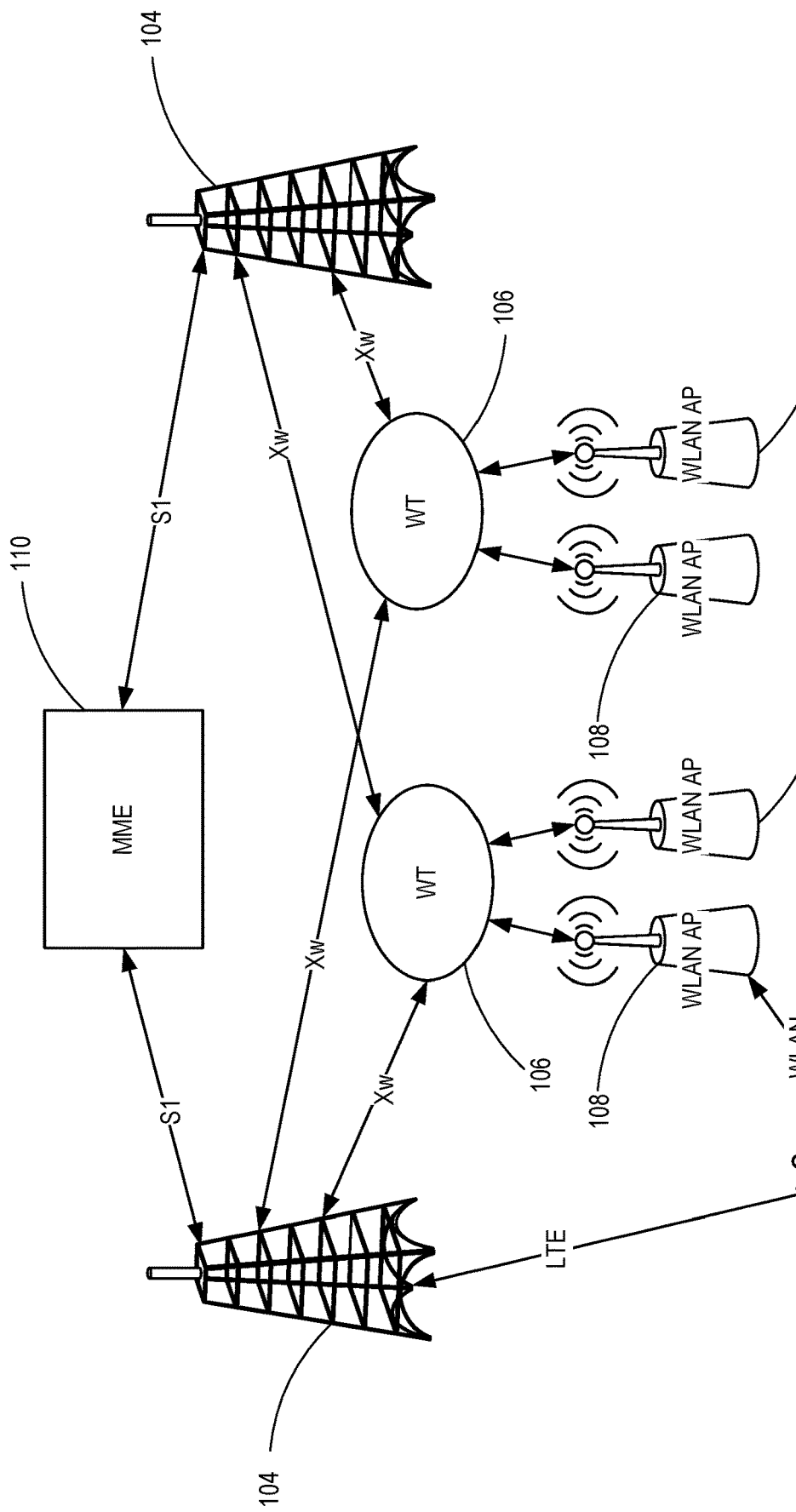
FIG. 1 is a schematic diagram illustrating a system for wireless local area network termination (WT) changes consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable uplink (UL) data splits between LTE and WLAN. The split can be UE controlled or network controlled. Both UE and network controlled bearer split architectures can be supported. The reporting of Uplink Buffer Status (BSR) and the subsequent data allocation can depend on what option is supported by the network. For UE controlled UL data splits, the UE determines a traffic split ratio between LTE and WLAN. The split can be based on local link conditions. For network controlled UL data splits, the network (e.g. a Link Aggregation Scheduler at the eNB) is responsible for making bearer split decisions. The decisions can be based on link qualities, available traffic and quality of service (QoS) requirements of associated users. The split can be based on a per bearer threshold, an eNB configured ratio, or an implicit inference based on a UL grant.

In an embodiment, long term evolution wireless local area network aggregation (LWA) supports downlink (DL) transmission on WLAN, which can limit uplink (UL) traffic to be supported by the LTE Uplink (i.e., uplink split bearer is not supported).

In one embodiment, UL data can be sent over wireless local area network (WLAN). This embodiment describes a behavior of the UE in case of absence of any split configuration (described below). For example, it defines the behavior of the UE in case the UL data to be sent does not exceed the ul-threshold configured by the network, or in case the threshold is not configured at all.

The eNB can send an information element (IE) while configuring the LWA DRB, "ul-DataLWADRB-ViaWLAN-r14", that configures the UE to send UL data over WLAN. The ul-DataLWADRB-ViaWLAN configuration can indicate whether the UE shall send packet data convergence protocol (PDCP) protocol data units (PDUs) via WLAN. E-UTRAN can configure the field (i.e. indicates value TRUE) for LWA data radio bearers (DRBs). For example, an example of a configuration (using abstract syntax notation (ASN)) using the ul-DataLWADRB-ViaWLAN-r14 setting is below:

```
PDCP-Config ::=                 SEQUENCE {
    discardTimer                ENUMERATED {
                                    ms50, ms100, ms150, ms300, ms500,
                                    ms750, ms1500, infinity
    }                                           OPTIONAL,        -- Cond Setup
    rlc-AM                      SEQUENCE {
        statusReportRequired        BOOLEAN
    }                                           OPTIONAL,        -- Cond Rlc-AM
    rlc-UM                      SEQUENCE {
        pdcp-SN-Size                ENUMERATED {len7bits, len12bits}
    }                                           OPTIONAL,        -- Cond Rlc-UM
    headerCompression           CHOICE {
        notUsed                     NULL,
        rohc                        SEQUENCE {
            maxCID                      INTEGER (1..16383)       DEFAULT 15,
            profiles                    SEQUENCE {
                profile0x0001               BOOLEAN,
                profile0x0002               BOOLEAN,
                profile0x0003               BOOLEAN,
                profile0x0004               BOOLEAN,
                profile0x0006               BOOLEAN,
                profile0x0101               BOOLEAN,
                profile0x0102               BOOLEAN,
                profile0x0103               BOOLEAN,
                profile0x0104               BOOLEAN
            },
            ...
        }
    },
    ...,
    [[  rn-IntegrityProtection-r10     ENUMERATED {enabled}     OPTIONAL -- Cond
    RN
    ]],
    [[  pdcp-SN-Size-v1130             ENUMERATED {len15bits}   OPTIONAL -- Cond
    Rlc-AM2
    ]],
    [[  ul-DataSplitDRB-ViaSCG-r12     BOOLEAN    OPTIONAL, -- Need ON
        t-Reordering-r12               ENUMERATED {
                                           ms0, ms20, ms40, ms60, ms80, ms100, ms120, ms140,
                                           ms160, ms180, ms200, ms220, ms240, ms260, ms280, ms300,
                                           ms500, ms750, spare14, spare13, spare12, spare11, spare10,
                                           spare9, spare8, spare7, spare6, spare5, spare4, spare3,
                                           spare2, spare1}                OPTIONAL -- Cond SetupS
    ]],
    [[  ul-DataSplitThreshold-r13      CHOICE {
            release                        NULL,
            setup                          ENUMERATED {
                                               b0, b100, b200, b400, b800, b1600, b3200, b6400, b12800,
                                               b25600, b51200, b102400, b204800, b409600, b819200,
                                               spare1}
        }                                           OPTIONAL -- Need ON
    ]],
    [[  ul-DataLWADRB-ViaWLAN-r14      BOOLEAN    OPTIONAL -- Need ON
    ]]
}
-- ASN1STOP
```

In other embodiments, UL data can be split between LTE and WLAN. Depending on the embodiment, the split can be UE controlled or network controlled. Both UE and Network controlled bearer split architectures can be supported. The reporting of Uplink Buffer Status (BSR) and the subsequent data allocation can depend on what option is supported by the network.

For UE controlled UL data splits, the UE determines a traffic split ratio between LTE and WLAN. The split can be based on local link conditions. Various algorithms can be used by the UE to determine the split ratio and can be UE implementation dependent. For example, a UE may split traffic based on estimates on relative rate ratios, relative delays, congestion levels, service/flow etc. In an embodiment, the eNB configures a maximum ratio or rates to be transmitted using WLAN while the split beneath the limit is kept to UE implementation.

For network controlled UL data splits, the network (e.g. a Link Aggregation Scheduler at the eNB) is responsible for making bearer split decisions, based on link qualities, available traffic and quality of service (QoS) requirements of associated users. Once the per-bearer split ratio is determined, the eNB can indicate this information to UE. The split can be based on (1) a per bearer threshold, (2) an eNB configured ratio, or (3) an implicit inference based on a UL grant.

For (1) a per bearer threshold, the eNB configures a per bearer threshold for the UE to consider sending data over WLAN. For example, when the UL data available to be sent is equal to or above this threshold, the UE sends data on both links. When data is below a threshold, a link is selected based on ul-DataLWADRB-viaWLAN as described above. Here the "ul-DataSplitThreshold-r13" that was added for dual carrier (DC) may be reused if DC and LWA are not to be simultaneously supported. Alternatively, an IE of ul-DataSplitThreshold-viaWLAN-r14 can be introduced. This enables supporting both DC and LWA at the same time while it is possible to be used only for LWA without DC. If such an IE is introduced, thresholds used for ul-DataSplitThreshold-r13 can be reused or other thresholds can be defined.

For (2) an eNB configured ratio, the eNB configures a ratio and the UE will send data to eNB via LTE and WLAN according to the configured ratio. An IE can be added of Ul-DataSplitRatio-ViaWLAN. This IE indicates a split ratio of UL data over WLAN for LWA DRBs. For example, a 10 corresponds to 10% over WLAN and 90% over LTE; a 20 corresponds to 20% over WLAN and 80% over LTE, and so on. An example of the IE in ASN is shown below:

```
PDCP-Config ::=                     SEQUENCE {
    discardTimer                    ENUMERATED {
                                        ms50, ms100, ms150, ms300, ms500,
                                        ms750, ms1500, infinity
    }                                                       OPTIONAL,    -- Cond Setup
    rlc-AM                          SEQUENCE {
        statusReportRequired        BOOLEAN
    }                                                       OPTIONAL,    -- Cond Rlc-AM
    rlc-UM                          SEQUENCE {
        pdcp-SN-Size                ENUMERATED {len7bits, len12bits}
    }                                                       OPTIONAL,    -- Cond Rlc-UM
    headerCompression               CHOICE {
        notUsed                     NULL,
        rohc                        SEQUENCE {
            maxCID                  INTEGER (1..16383)          DEFAULT 15,
            profiles                SEQUENCE {
                profile0x0001       BOOLEAN,
                profile0x0002       BOOLEAN,
                profile0x0003       BOOLEAN,
                profile0x0004       BOOLEAN,
                profile0x0006       BOOLEAN,
                profile0x0101       BOOLEAN,
                profile0x0102       BOOLEAN,
                profile0x0103       BOOLEAN,
                profile0x0104       BOOLEAN
            },
            ...
        }
    },
    ...,
    [[  rn-IntegrityProtection-r10      ENUMERATED {enabled}   OPTIONAL -- Cond RN
    ]],
    [[  pdcp-SN-Size-v1130              ENUMERATED {len15bits} OPTIONAL -- Cond Rlc-AM2
    ]],
    [[  ul-DataSplitDRB-ViaSCG-r12      BOOLEAN    OPTIONAL, -- Need ON
        t-Reordering-r12                ENUMERATED {
                                            ms0, ms20, ms40, ms60, ms80, ms100, ms120, ms140,
                                            ms160, ms180, ms200, ms220, ms240, ms260, ms280, ms300,
                                            ms500, ms750, spare14, spare13, spare12, spare11, spare10,
                                            spare9, spare8, spare7, spare6, spare5, spare4, spare3,
                                            spare2, spare1}                  OPTIONAL -- Cond SetupS
    ]],
    [[  ul-DataSplitThreshold-r13       CHOICE {
            release                     NULL,
            setup                       ENUMERATED {
                                            b0, b100, b200, b400, b800, b1600, b3200, b6400, b12800,
                                            b25600, b51200, b102400, b204800, b409600, b819200,
                                            spare1}
        }                                                   OPTIONAL   -- Need ON
]] PDCP-Config ::=                     SEQUENCE {
    discardTimer                    ENUMERATED {
                                        ms50, ms100, ms150, ms300, ms500,
                                        ms750, ms1500, infinity
    }                                                       OPTIONAL,    -- Cond Setup
    rlc-AM                          SEQUENCE {
        statusReportRequired        BOOLEAN
    }                                                       OPTIONAL,    -- Cond Rlc-AM
    rlc-UM                          SEQUENCE {
        pdcp-SN-Size                ENUMERATED {len7bits, len12bits}
    }                                                       OPTIONAL,    -- Cond Rlc-UM
    headerCompression               CHOICE {
        notUsed                     NULL,
        rohc                        SEQUENCE {
```

```
            maxCID                    INTEGER (1..16383)         DEFAULT 15,
            profiles                  SEQUENCE {
               profile0x0001                 BOOLEAN,
               profile0x0002                 BOOLEAN,
               profile0x0003                 BOOLEAN,
               profile0x0004                 BOOLEAN,
               profile0x0006                 BOOLEAN,
               profile0x0101                 BOOLEAN,
               profile0x0102                 BOOLEAN,
               profile0x0103                 BOOLEAN,
               profile0x0104                 BOOLEAN
            },
            ...
         }
      },
      ...,
   [[    rn-IntegrityProtection-r10     ENUMERATED {enabled}   OPTIONAL -- Cond
RN
   ]],
   [[    pdcp-SN-Size-v1130             ENUMERATED {len15bits} OPTIONAL -- Cond
Rlc-AM2
   ]],
   [[    ul-DataSplitDRB-ViaSCG-r12              BOOLEAN        OPTIONAL, -- Need ON
         t-Reordering-r12             ENUMERATED {
                                ms0, ms20, ms40, ms60, ms80, ms100, ms120, ms140,
                                ms160, ms180, ms200, ms220, ms240, ms260, ms280, ms300,
                                ms500, ms750, spare14, spare13, spare12, spare11, spare10,
                                spare9, spare8, spare7, spare6, spare5, spare4, spare3,
                                spare2, spare1}                OPTIONAL -- Cond SetupS
   ]],
   [[    ul-DataSplitThreshold-r13    CHOICE {
            release            NULL,
            setup              ENUMERATED {
                                b0, b100, b200, b400, b800, b1600, b3200, b6400, b12800,
                                b25600, b51200, b102400, b204800, b409600, b819200,
                                spare1}
         }                                                     OPTIONAL -- Need ON
   ]],
   [[ ul-DataSplitRatio-viaWLAN-r14               INTEGER(1..100),    OPTIONAL --Need OR
   ]]
-- ASN1STOP
```

For (3) an implicit inference based on a UL grant, a "capacity" for sending data over WLAN can be inferred implicitly for the UE based on eNB UL grant (i.e., LTE resource grant). The UE sends the amount of data over LTE that is granted (after addressing the priorities across bearers), after that the UE sends the remaining data over WLAN.

A buffer status report (BSR) can be used to indicate over which link data will be transmitted. Once the amount of UL data to be transmitted on LTE and WLAN (e.g., split ratio or threshold) is determined, the BSR reporting can take different forms. In contrast to DC, the BSR is reported to the LTE eNB, as a WLAN scheduler may not be able to interpret the BSR. However, an alternate mechanism can be supported to reserve capacity on WLAN link (e.g. via add traffic stream (ADDTS) feature specified in IEEE 802.11-2012, or others such as where a specific probability of transmission can be configured for the WLAN link). The BSR can be used by the UE to (1) indicate a portion of data to be sent over LTE, (2) indicate the total data to be sent, (3) indicate portions of data to be sent over LTE and WLAN, (4) report if the UE data exceeds a threshold or (5) report data to be sent over LTE if the UL data exceeds a threshold.

For (1) to indicate a portion of data to be sent over LTE, the UE splits the data, and indicates the portion of the data to be sent over LTE only in the BSR. This split ratio can be network configured, or it can be up to UE implementation.

For (2) to indicate the total data to be sent, UE indicates the UL data to be sent in the BSR. This BSR is received by the link aggregation scheduler, which in turn determines the proportion of traffic to be allocated across both links. As traffic across both links is controlled by the same eNB, this info can be beneficial to eNB's traffic splitting decisions.

For (3) to indicate portions of data to be sent over LTE and WLAN, the BSR can be enhanced to indicate portions of data to be sent over LTE and WLAN. Alternatively, the UE can indicate a BSR for total traffic and the percentage of traffic over LTE. In some embodiments, conventional BSR reporting is not to be applied over the WLAN link. Rather, alternative methods for negotiating capacity reservation over the WLAN link are supported. For example, a UE can use "Admission Control" as described in IEEE 802.11-2012 para. 6.3.26.4 (MLME-ADDTS.indication) and 8.4.2.32 (TSPEC element). In an embodiment, the UE can indicate the support of Admission Control via a capability bit.

For (4) to report if the UE data exceeds a threshold, data transmission is prioritized over the WLAN link. The network configures a BSR threshold. If the UE data exceeds the threshold, the UE reports a BSR to eNB. Otherwise, (i.e. if the data is below the threshold) the UE does not report in a BSR. For example, when the UE does not report BSR, the UE sends data via WLAN. No UL grant is needed from the eNB.

For (5) to report data to be sent over LTE if the UL data exceeds a threshold, the network configures a threshold. If the pending data in the UE UL buffers data exceeds the threshold, the UE reports the portion of UL data to be sent over LTE only in the BSR The eNB can use the BSR to aid in determining UL grants. For example, if a LTE specific BSR is reported to the eNB, the eNB configures the LTE UL grants based on the expected traffic on the LTE link. Alternatively, if aggregate BSR is reported to the eNB (Link Aggregation Scheduler), the eNB determines the split ratio and configures the UL grants based on the proportion of the traffic to be carried over the LTE link.

In one embodiment, it is feasible to negotiate capacity on the WLAN link. Capacity corresponding to traffic to be sent over the WLAN is also reserved: For example, the UE and/or eNB negotiate WLAN capacity based on methods including admission control or others specified in IEEE 802.111-2012, (e.g., "Admission Control" referenced in IEEE 802.11-2012 para. 6.3.26.4 (MLME-ADDTS.indication) and 8.4.2.32 (TSPEC element)). For example, the eNB specifies a "probability of transmission" over the WLAN link, which the UE uses to access the WLAN channel.

In some embodiments, a default UL interface can be selected, such as WLAN or LTE. For example, the default interface can be used first to send data before a threshold is reached.

An example of the changed procedures for PDCP entities follows:

The PDCP entities are located in the PDCP sublayer. Several PDCP entities may be defined for a UE. Each PDCP entity carrying user plane data may be configured to use header compression.

Each PDCP entity is carrying the data of one radio bearer. In this version of the specification, only the robust header compression protocol (ROHC), is supported. Every PDCP entity uses at most one ROHC compressor instance and at most one ROHC decompressor instance.

A PDCP entity is associated either to the control plane or the user plane depending on which radio bearer it is carrying data for.

Figure 4:
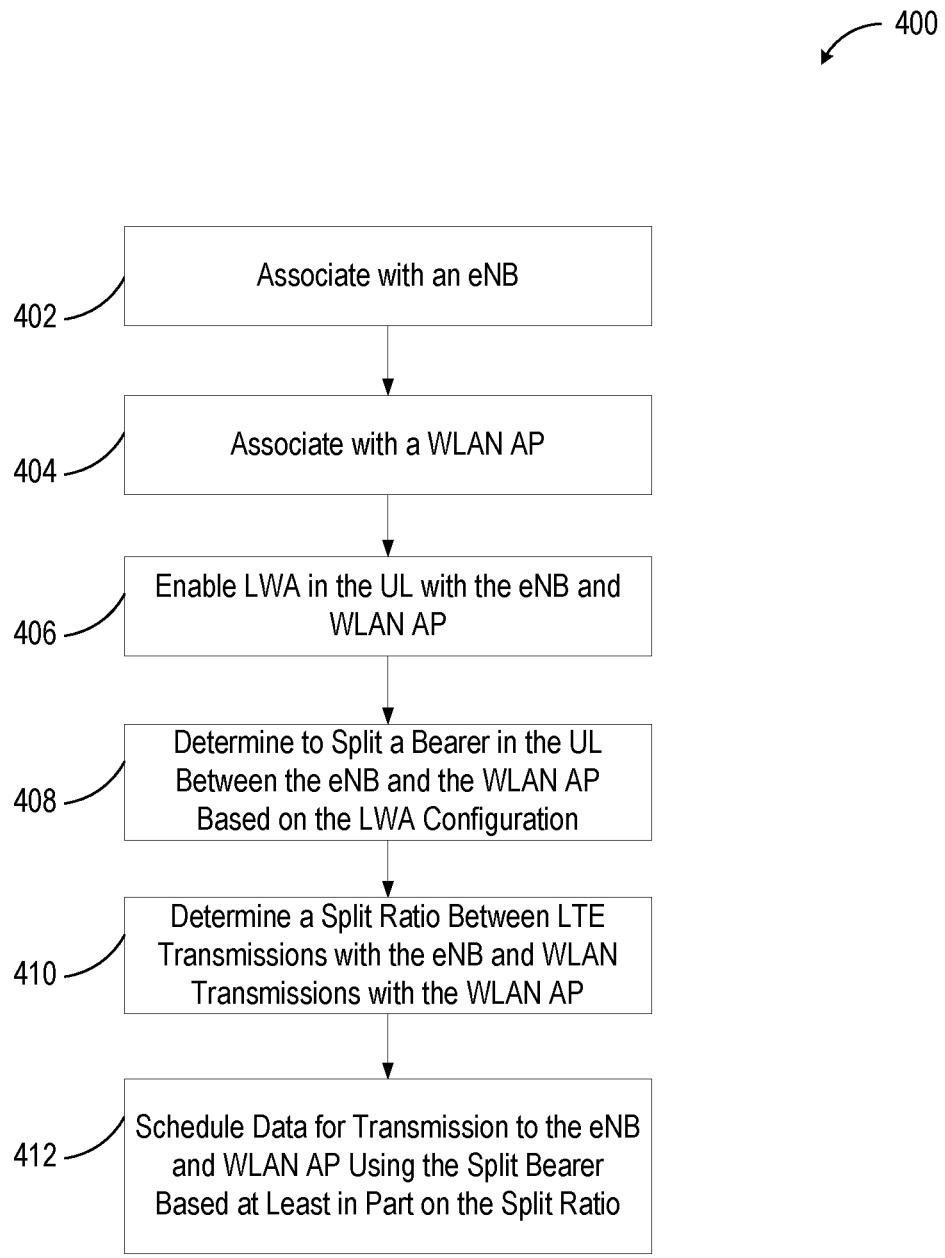
FIG. 4 is a flow chart illustrating a method for using an uplink bearer split using wireless local area network aggregation consistent with embodiments disclosed herein.

FIG. 4.2.2.1 represents the functional view of the PDCP entity for the PDCP sublayer; it should not restrict implementation. The figure is based on the radio interface protocol architecture defined in [2].

For RNs, integrity protection and verification are also performed for the u-plane.

For split bearers (DC and LWA), routing is performed in the transmitting PDCP entity, and reordering is performed in the receiving PDCP entity. When submitting PDCP PDUs to lower layers upon request from lower layers, the transmitting PDCP entity shall:

if ul-DataSplitThreshold is configured and the data available for transmission is larger than or equal to ul-DataSplitThreshold:
  if the DRB is a DC DRB
    submit the PDCP PDUs to either the associated AM RLC entity configured for SCG or the associated AM RLC entity configured for MCG;
  else if the DRB is a LWA DRB
    submit the PDCP PDUs to either the associated WLAN entity (transmit over WLAN), or the associated AM RLC entity configured (transmit over LTE);
else:
  if the DRB is a DC DRB
    if ul-DataSplitDRB-ViaSCG is set to TRUE by upper layers [3]:
      submit the PDCP PDUs to the associated AM RLC entity configured for SCG;
    else:
      submit the PDCP PDUs to the associated AM RLC entity configured for MCG
  if the DRB is a LWA DRB
    if ul-DataLWADRB-ViaWLAN is set to TRUE by upper layers [3]:
      submit the PDCP PDUs to the associated WLAN entity configured;
    else:
      submit the PDCP PDUs to the associated AM RLC entity configured.

An example of the changed procedures for Data available for transmission follows:

For the purpose of MAC buffer status reporting, the UE shall consider PDCP Control PDUs, as well as the following as data available for transmission in the PDCP layer:

For SDUs for which no PDU has been submitted to lower layers:
  the SDU itself, if the SDU has not yet been processed by PDCP, or
  the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:
  the SDU, if it has not yet been processed by PDCP, or
  the PDU once it has been processed by PDCP.

For split bearers, when indicating the data available for transmission to the MAC entity for BSR triggering and Buffer Size calculation, the UE shall:

if ul-DataSplitThreshold is configured and the data available for transmission is larger than or equal to ul-DataSplitThreshold:
  if the DRB is a DC DRB
    indicate the data available for transmission to both the MAC entity configured for SCG and the MAC entity configured for MCG;
  else if the DRB is a LWA DRB
    indicate the data available for transmission to the MAC entity configured;
else:
  if the DRB is a DC DRB
    if ul-DataSplitDRB-ViaSCG is set to TRUE by upper layer [3]:
      indicate the data available for transmission to the MAC entity configured for SCG only;
    if ul-DataSplitThreshold is configured, indicate the data available for transmission as 0 to the MAC entity configured for MCG;
  else:
    indicate the data available for transmission to the MAC entity configured for MCG only;

if ul-DataSplitThreshold is configured, indicate the data available for transmission as 0 to the MAC entity configured for SCG.
　　if the DRB is a LWA DRB
　　　if ul-DataLWADRB-ViaWLAN is set to TRUE by upper layer [3]:
　　　　if ul-DataSplitThreshold is configured, indicate the data available for transmission as 0 to the MAC entity configured;
　　　else:
　　　　indicate the data available for transmission to the MAC entity configured;

FIG. 1 is a schematic diagram illustrating a system for wireless local area network termination (WT) changes consistent with embodiments disclosed herein. A UE 102 can transmit and receive data over an LTE RAT with an eNB and over a WLAN RAT with a WLAN AP 108. Data sent to or received by the WLAN AP 108 can be administered by a WT 106. The WT 106 communicates with the eNB 104 over an Xw interface to coordinate data transmissions to and from the UE 102. The simultaneous connection of the UE 102 with the eNB 104 and WLAN AP 108 allows the eNB to determine a routing of data to the UE 102. The eNB can use the routing to improve network communication (e.g., reduce saturation of a RAN, etc.) and/or UE communication (e.g., respond to signal quality, etc.). The eNB 104 can also provide access to a core network and/or core network functions for the UE 102 through either the WLAN RAT or the LTE RAT.

In an example of the system using a split where the LTE link is prioritized, the following operations can occur. The eNB 104 configures a threshold based on the split ratio determined by the eNB 104. The UE 102 sends BSR to the eNB 104 accounting for a threshold (data in excess of the threshold is not reported). The eNB 104 sends a UL grant in proportion of the BSR. The UE 102 knows the amount of data to be sent on WLAN to the WLAN AP 108. The eNB 104 can optionally configure a WLAN preferred mode and an associated threshold. A BSR is sent on LTE by the UE 102, if the threshold is exceeded. The eNB 104 allocates data in proportion to the request.

In one embodiment, the eNB 104 can determine to transition the UE 102 from a source WT 106 to a target WT 106 (which can be based on information, such as signal quality, congestion and/or network characteristics like bandwidth, latency, congestion, etc.). The eNB 104 can generate a wireless local area network termination (WT) addition message for a target WT 106 identifying the UE 102. The WT 106 can send a WT addition request acknowledge message to the eNB 104. The eNB can generate a WT release request for a source WT 106 to release allocated WLAN resources for the UE 102. The eNB 104 can generate a connection reconfiguration request for the UE 102 identifying the target WT 106. The UE 102 can send a connection reconfiguration request complete message to the eNB 104 after associating with the target WT 106. The eNB 104 can receive an association confirmation message from the UE 102 or the target WT 106.

Figure 2:
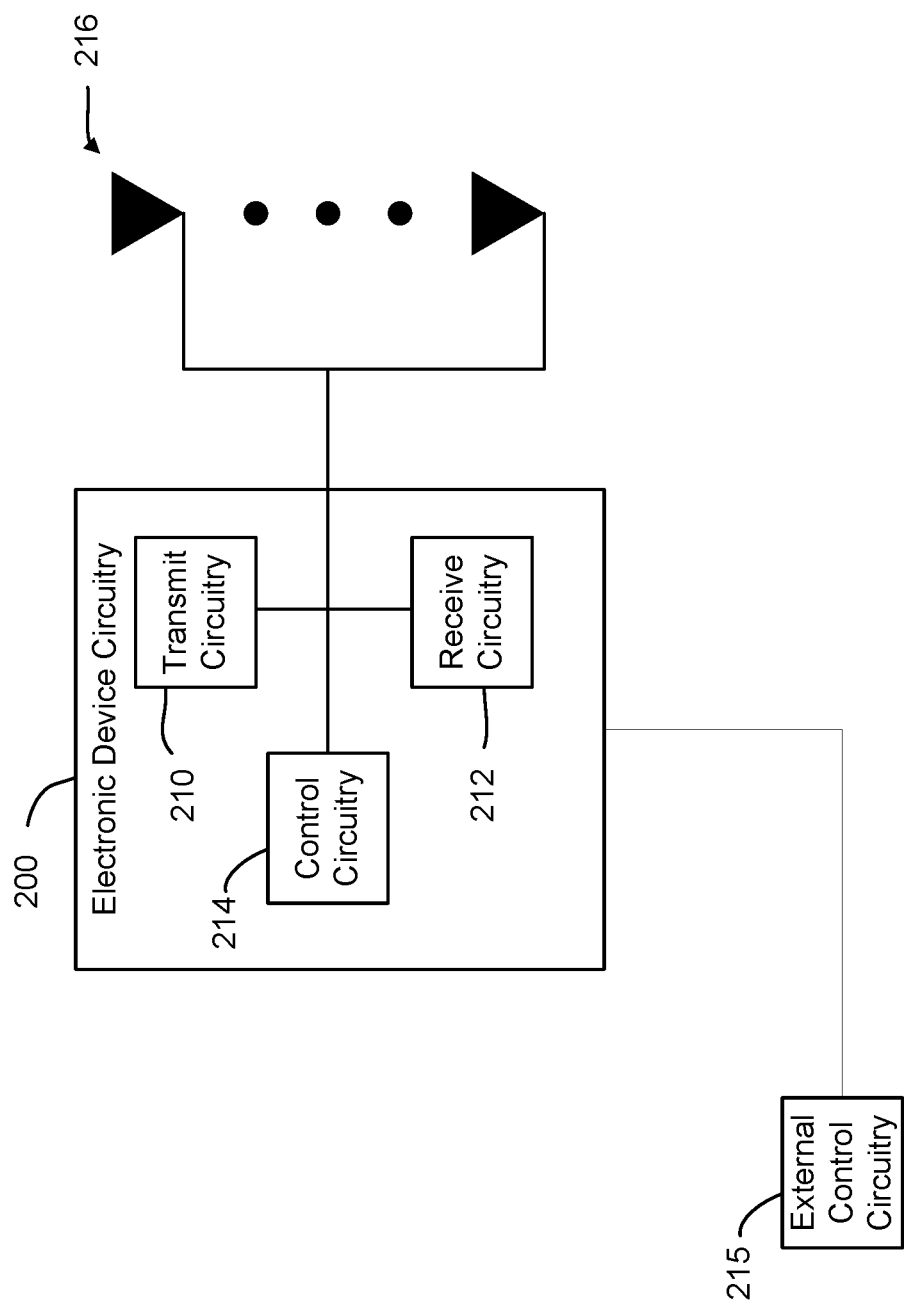
FIG. 2 is a block diagram illustrating electronic device circuitry 200 that may be radio access network (RAN) node circuitry consistent with embodiments disclosed herein.

FIG. 2 is a block diagram illustrating electronic device circuitry 200 that may be radio access node (RAN), node circuitry (such as an eNB circuitry), UE circuitry, network node circuitry, or some other type of circuitry in accordance with various embodiments. In embodiments, the electronic device circuitry 200 may be, or may be incorporated into or otherwise a part of, a RAN Node (e.g., an eNB), a UE, a mobile station (MS), a BTS, a network node, or some other type of electronic device. In embodiments, the electronic device circuitry 200 may include radio transmit circuitry 210 and receive circuitry 212 coupled to control circuitry 214 (e.g., baseband processor(s), etc.). In embodiments, the transmit circuitry 210 and/or receive circuitry 212 may be elements or modules of transceiver circuitry, as shown. In some embodiments, some or all of the control circuitry 215 can be in a device separate or external from the transmit circuitry 210 and the receive circuitry 212 (baseband processors shared by multiple antenna devices, as in cloud-RAN (C-RAN) implementations, for example).

The electronic device circuitry 210 may be coupled with one or more plurality of antenna elements 216 of one or more antennas. The electronic device circuitry 200 and/or the components of the electronic device circuitry 200 may be configured to perform operations similar to those described elsewhere in this disclosure.

In embodiments where the electronic device circuitry 200 is or is incorporated into or otherwise part of a UE, the transmit circuitry 210 can transmit data as shown in FIG. 1. The receive circuitry 212 can receive data as shown in FIG. 1.

In embodiments where the electronic device circuitry 200 is an eNB, BTS and/or a network node, or is incorporated into or is otherwise part of an eNB, BTS and/or a network node, the transmit circuitry 210 can transmit data as shown in FIG. 1. The receive circuitry 212 can receive data as shown in FIG. 1.

In certain embodiments, the electronic device circuitry 200 shown in FIG. 2 is operable to perform one or more methods, such as the methods shown in FIG. 4.

Figure 3:
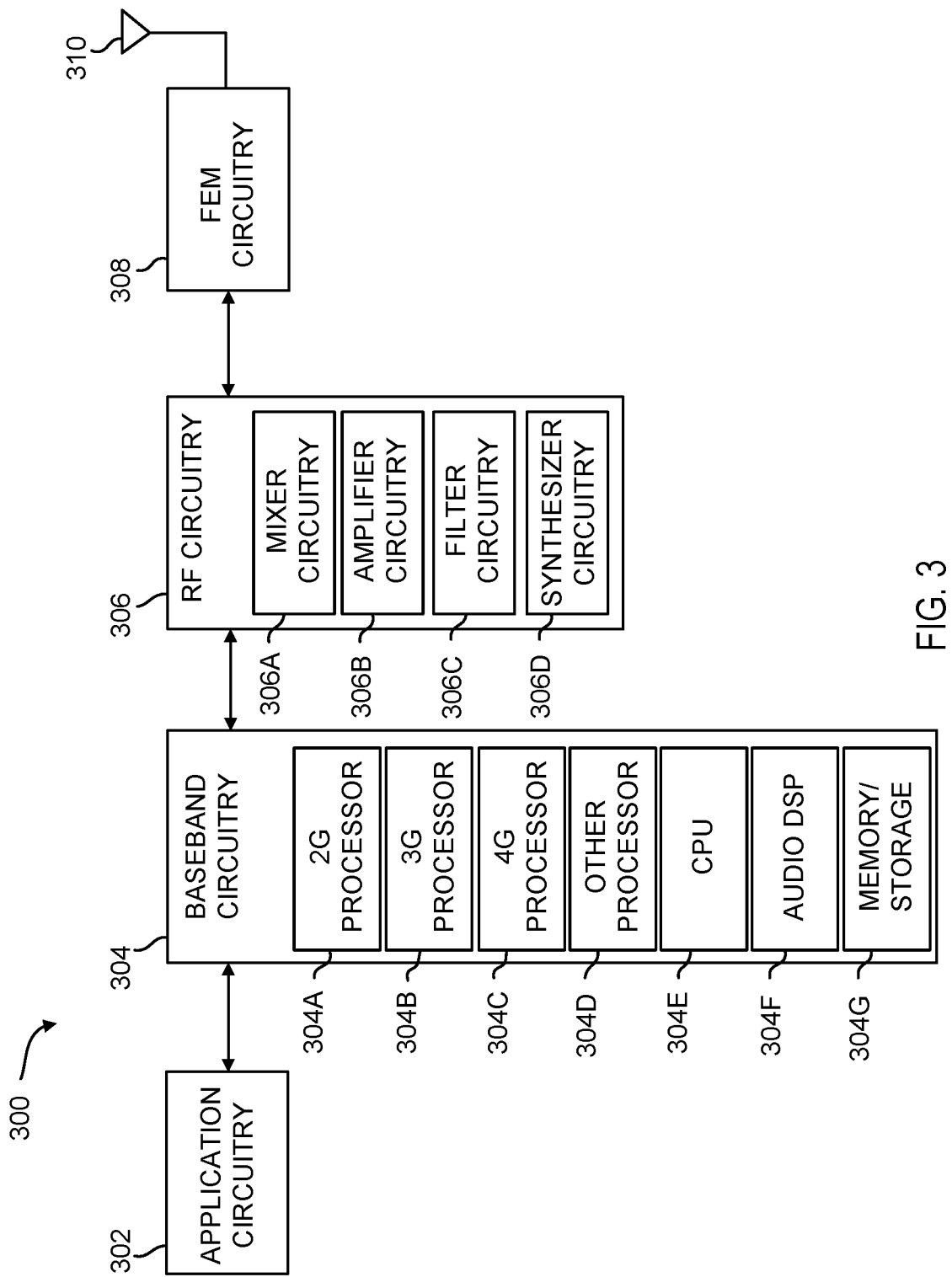
FIG. 3 is a block diagram illustrating, for one embodiment, example components of a user equipment (UE) or mobile station (MS) consistent with embodiments disclosed herein.

Embodiments described herein may be implemented into a system using any suitably configured hardware and/or software. FIG. 3 is a block diagram illustrating, for one embodiment, example components of a user equipment (UE) or mobile station (MS) device 300. In some embodiments, the UE device 300 may include application circuitry 302, baseband circuitry 304, Radio Frequency (RF) circuitry 306, front-end module (FEM) circuitry 308, and one or more antennas 310, coupled together at least as shown in FIG. 3.

The application circuitry 302 may include one or more application processors. By way of non-limiting example, the application circuitry 302 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 304 may include one or more single-core or multi-core processors. The baseband circuitry 304 may include one or more baseband processors and/or control logic. The baseband circuitry 304 may be configured to process baseband signals received from a receive signal path of the RF circuitry 306. The baseband 304 may also be configured to generate baseband signals for a transmit signal path of the RF circuitry 306. The baseband processing circuitry 304 may interface with the application circuitry 302 for generation and processing of the baseband signals, and for controlling operations of the RF circuitry 306.

By way of non-limiting example, the baseband circuitry 304 may include at least one of a second generation (2G) baseband processor 304A, a third generation (3G) baseband processor 304B, a fourth generation (4G) baseband processor 304C, other baseband processor(s) 304D for other existing generations, and generations in development or to be developed in the future (e.g., fifth generation (5G), 6G, etc.). The baseband circuitry 304 (e.g., at least one of baseband processors 304A-304D) may handle various radio control functions that enable communication with one or more radio networks via the RF circuitry 306. By way of non-limiting example, the radio control functions may include signal modulation/demodulation, encoding/decoding, radio frequency shifting, other functions, and combinations thereof. In some embodiments, modulation/demodulation circuitry of the baseband circuitry 304 may be programmed to perform Fast-Fourier Transform (FFT), precoding, constellation mapping/demapping functions, other functions, and combinations thereof. In some embodiments, encoding/decoding circuitry of the baseband circuitry 304 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 304 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 304E of the baseband circuitry 304 may be programmed to run elements of the protocol stack for signaling of the PHY, MAC, RLC, PDCP and/or RRC layers. In some embodiments, the baseband circuitry 304 may include one or more audio digital signal processor(s) (DSP) 304F. The audio DSP(s) 304F may include elements for compression/decompression and echo cancellation. The audio DSP(s) 304F may also include other suitable processing elements.

The baseband circuitry 304 may further include memory/storage 304G. The memory/storage 304G may include data and/or instructions for operations performed by the processors of the baseband circuitry 304 stored thereon. In some embodiments, the memory/storage 304G may include any combination of suitable volatile memory and/or nonvolatile memory. The memory/storage 304G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 304G may be shared among the various processors or dedicated to particular processors.

Components of the baseband circuitry 304 may be suitably combined in a single chip, a single chipset, or disposed on a same circuit board in some embodiments. In some embodiments, some or all of the constituent components of the baseband circuitry 304 and the application circuitry 302 may be implemented together, such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) and/or other wireless metropolitan area networks (WMAN), a wireless local area network (WLAN), and/or a wireless personal area network (WPAN). Embodiments in which the baseband circuitry 304 is configured to support radio communications of more than one wireless protocol may be referred to as multi-mode baseband circuitry.

The RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. The RF circuitry 306 may include a receive signal path which may include circuitry to down-convert RF signals received from the FEM circuitry 308, and provide baseband signals to the baseband circuitry 304. The RF circuitry 306 may also include a transmit signal path which may include circuitry to up-convert baseband signals provided by the baseband circuitry 304, and provide RF output signals to the FEM circuitry 308 for transmission.

In some embodiments, the RF circuitry 306 may include a receive signal path and a transmit signal path. The receive signal path of the RF circuitry 306 may include mixer circuitry 306A, amplifier circuitry 306B, and filter circuitry 306C. The transmit signal path of the RF circuitry 306 may include filter circuitry 306C and mixer circuitry 306A. The RF circuitry 306 may further include synthesizer circuitry 306D configured to synthesize a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals.

The filter circuitry 306C may include a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may include zero-frequency baseband signals, although this is not a requirement. In some embodiments, the mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C. The filter circuitry 306C may include a low-pass filter (LPF), although the scope of the embodiments is not limited in this respect. In some embodiments, the mixer circuitry 306A of the receive signal path and the mixer circuitry 306A of the transmit signal path may include two or more mixers, and may be arranged for quadrature downconversion and/or upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and/or direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 306 may include analog-to-digital converter (ADC) and digital-to-analog converter (DAC) circuitry, and the baseband circuitry 304 may include a digital baseband interface to communicate with the RF circuitry 306.

In some dual-mode embodiments, separate radio IC circuitry may be provided for processing signals for each spectrum, although the scope of the embodiments is not limited in this respect.

In some embodiments, the synthesizer circuitry 306D may include one or more of a fractional-N synthesizer and a fractional N/N+1 synthesizer, although the scope of the embodiments is not limited in this respect as other types of frequency synthesizers may be suitable. For example, synthesizer circuitry 306D may include a delta-sigma synthesizer, a frequency multiplier, a synthesizer comprising a phase-locked loop with a frequency divider, other synthesizers and combinations thereof.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

The synthesizer circuitry 306D of the RF circuitry 306 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 306D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

The FEM circuitry 308 may include a receive signal path which may include circuitry configured to operate on RF signals received from one or more antennas 310, amplify the received signals, and provide the amplified versions of the received signals to the RF circuitry 306 for further processing. The FEM circuitry 308 may also include a transmit signal path which may include circuitry configured to amplify signals for transmission provided by the RF circuitry 306 for transmission by at least one of the one or more antennas 310.

In some embodiments, the FEM circuitry 308 may include a TX/RX switch configured to switch between a transmit mode and a receive mode operation. The FEM circuitry 308 may include a receive signal path and a transmit signal path. The receive signal path of the FEM circuitry 308 may include a low-noise amplifier (LNA) to amplify received RF signals and provide the amplified received RF signals as an output (e.g., to the RF circuitry 306). The transmit signal path of the FEM circuitry 308 may include a power amplifier (PA) configured to amplify input RF signals (e.g., provided by RF circuitry 306), and one or more filters configured to generate RF signals for subsequent transmission (e.g., by one or more of the one or more antennas 310).

In some embodiments, the MS device 300 may include additional elements such as, for example, memory/storage, a display, a camera, one or more sensors, an input/output (I/O) interface, other elements, and combinations thereof.

In some embodiments, the MS device 300 may be configured to perform one or more processes, techniques, and/or methods as described herein, or portions thereof.

FIG. 4 is a flow chart illustrating a method for using an uplink bearer split using wireless local area network aggregation. The method 400 can be performed by systems, such as those shown in FIG. 1, including the UE 102, RAN node 104, WT 106 and/or WLAN AP 108. In block 402, the UE associates with an eNB. In block 404, the UE associates with a wireless local area network (WLAN) access point (AP). In block 406, the UE enables LWA in the uplink (UL) with the eNB and WLAN AP. In block 408, the UE determines to split a bearer in the UL between the eNB and the WLAN AP based on the LWA configuration. In block 410, the UE determines a split ratio between long term evolution (LTE) transmissions with the eNB and WLAN transmissions with the WLAN AP. In block 412, the UE schedules data for transmission to the eNB and WLAN AP using the split bearer based at least in part on the split ratio.

Figure 5:
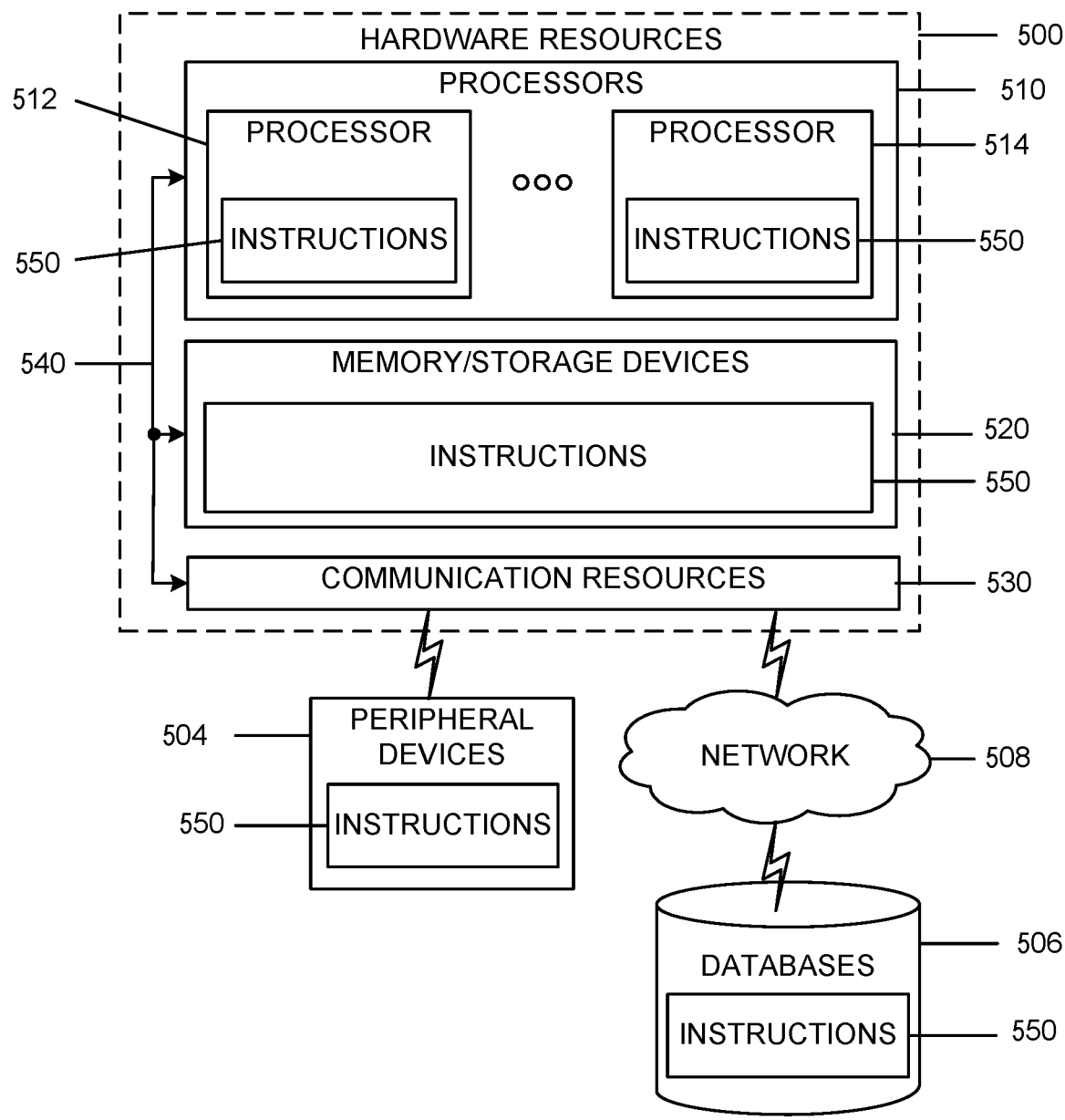
FIG. 5 is a diagram of a computing system consistent with embodiments disclosed herein.

FIG. 5 is a block diagram illustrating components, according to some example embodiments, able to read instructions from a machine-readable or computer-readable medium (e.g., a machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which are communicatively coupled via a bus 540.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514. The memory/storage devices 520 may include main memory, disk storage, or any suitable combination thereof.

The communication resources 530 may include interconnection and/or network interface components or other suitable devices to communicate with one or more peripheral devices 504 and/or one or more databases 506 via a network 508. For example, the communication resources 530 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 and/or the databases 506. Accordingly, the memory of processors 510, the memory/storage devices 520, the peripheral devices 504, and the databases 506 are examples of computer-readable and machine-readable media.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

EXAMPLES

The following examples pertain to further embodiments.

Example 1 is an apparatus of a user equipment (UE). The apparatus contains storage designed to store a long term evolution wireless local area network aggregation (LWA) configuration. The apparatus contains a processor designed to associate with an eNB and associate with a wireless local area network (WLAN) access point (AP). The apparatus further contains a processor designed to enable LWA in the uplink (UL) with the eNB and WLAN AP and determine to split a bearer in the UL between the eNB and the WLAN AP based on the LWA configuration. The apparatus also contains a processor designed to determine a split ratio between a long term evolution (LTE) transmissions with the eNB and WLAN transmissions with the WLAN AP, and schedule data for transmission to the eNB and WLAN AP using the split bearer based at least in part on the split ratio.

Example 2 is the apparatus of Example 1, where to associate with an eNB further includes establishing an RRC connection.

Example 3 is the apparatus of Example 1, where the processor is designed to process a message form the eNB designing the split bearer in the UL.

Example 4 is the apparatus of Example 3, where the eNB provides a threshold after which data will be split between a cellular channel attached to the eNB and a WLAN channel attached to the WLAN AP.

Example 5 is the apparatus of Example 1, where the processor is further designed to split UL data between the eNB and the WLAN AP based on estimates on relative rate ratios, relative delays or congestion levels.

Example 6 is the apparatus of Example 1, where the processor is further designed to process an indicator from the eNB indicating a maximum rate to be transmitted on WLAN.

Example 7 is the apparatus of Example 1, where the processor is further designed to process an indicator from the eNB indicating a maximum ratio of data to be transmitted on WLAN.

Example 8 is the apparatus of Example 1, where the processor is further designed to use WLAN procedures to indicate an amount of the data to be transmitted to a WLAN termination (WT) attached to the WLAN AP.

Example 9 is the apparatus of Example 8, where the WLAN procedures contains an admission control procedure indicating a capacity for UL data transmission using WLAN.

Example 10 is the apparatus of Example 1, where the processor is further designed to process a split ratio received from the eNB.

Example 11 is the apparatus of Example 1, where the processor is further designed to process a default UL interface for the split bearer.

Example 12 is the apparatus of Example 11, where the default interface is LTE or WLAN.

Example 13 is the apparatus of Example 1, where the processor is further designed to process a probability of a transmission using a WLAN link and use the probability to access a WLAN channel attached to the WLAN AP.

Example 14 is the apparatus of Example 1, where the processor is further designed to generate a buffer status report for the eNB.

Example 15 is the apparatus of Example 14, where to generate a buffer status report further includes processing the data to send using the split bearer, determining a portion of the data to send to the eNB, and generating the buffer status report including an indicator of the portion of data to send to the eNB.

Example 16 is the apparatus of Example 14, where to generate a buffer status report further includes processing data to send using the split bearer, generating the buffer status report including an indicator of the total data, and processing an indicator of a traffic splitting decision from the eNB.

Example 17 is the apparatus of Example 14, where to generate a buffer status report further includes processing data to send using the split bearer, and generating the buffer status report including an indicator of the data to be sent over a first wireless channel to the eNB and over a second wireless channel to the WLAN AP.

Example 18 is the apparatus of Example 17, where to generate the buffer status report, including the indicator, further includes generating the indicator and including a total data indicator as well as a percentage of the total data to send over the first wireless channel.

Example 19 is the apparatus of Example 17, where to generate the buffer status report including the indicator further includes generating the indicator including a first data indicator indicating a first portion of the data to send using the first wireless channel to the eNB, and a second portion of the data to send using the second wireless channel to the WLAN AP.

Example 20 is the apparatus of Example 14, where to generate a buffer status report further includes processing data to send using the split bearer, and processing a buffer status report threshold from the eNB. Processing a buffer status report threshold from the eNB includes transmitting at least a portion of the data over a second wireless channel to the WLAN AP and when the data exceeds the buffer status report threshold, generating the buffer status report including an indicator of the data to be sent over a first wireless channel to the eNB.

Example 21 is the apparatus of Example 14, where to generate a buffer status report further includes processing data to send using the split bearer, and processing a buffer status report threshold from the eNB. Processing a buffer status report threshold from the eNB includes transmitting at least a portion of the data over a first wireless channel to the eNB, and when the data exceeds the buffer status report threshold, generating the buffer status report including an indicator of the data to be sent over a second wireless channel to the WLAN AP.

Example 22 is the apparatus of Example 14, where to generate a buffer status report further includes processing data to send using the split bearer, and processing a buffer status report threshold from the eNB, and when the data is in a UE UL buffer and exceeds the buffer status report threshold, generating the buffer status report including an indicator of the data to be sent over a first wireless channel to the eNB.

In Example 23, the apparatus of any of Examples 1-22, further contains a WLAN interface attached to the processor and designed to communicate with a WLAN termination (WT) through the WLAN access point (AP).

In Example 24, the apparatus of any of Examples 1-22, further contains a LTE interface attached to the processor and designed to communicate with the eNB.

Example 25 is the system of any of any of Examples 1-22, where the processor is a baseband processor.

Example 26 is an apparatus of an enhanced node B (eNB). The apparatus includes storage for a long term evolution wireless local area network aggregation (LWA) configuration. The apparatus includes a processor. The processor is designed to associate with a user equipment (UE) through a cellular interface, and determine that the UE is connected to a wireless local area network (WLAN). The apparatus includes access point (AP) using a WLAN termination (WT), the WT attached to the eNB through a Xw interface which determines a bearer split for the UE over a UE cellular interface and a UE WLAN interface. The apparatus includes generate LWA configuration for the UE including the bearer split for the UE. The apparatus also includes process messages from the UE data received over the cellular interface and the Xw interface to form a single bearer.

Example 27 is the apparatus of Example 26, where the processor is further designed to generate a threshold for the UE, when threshold is exceeded, the UE is designed to use both the UE cellular interface and UE WLAN interface to send data in the uplink.

Example 28 is the apparatus of Example 26, where the processor is further designed to generate a ratio indicating a portion of uplink (UL) data for the UE to send using WLAN.

Example 29 is the apparatus of Example 26, where the processor is further designed to generate a ratio indicating a portion of uplink (UL) data for the UE to send using the cellular interface.

Example 30 is the apparatus of Example 26, where the processor is designed to generate a UL grant for the UE cellular interface to send a portion of data and a remainder of the data is designed to send over WLAN.

Example 31 is the apparatus of Example 26, where the processor is further designed to generate a probability of transmission using the WLAN.

Example 32 is the apparatus of Example 31, where the processor is further designed to send the probability of transmission using the WLAN to the UE.

Example 33 is the apparatus of Example 26, where the processor is designed to generate bearer split decisions based on link qualities, and available traffic or quality of service requirements of a set of UEs associated with the eNB.

Example 34 is the apparatus of any of Examples 26-33, where the apparatus further includes the Xw interface attached to the WT, and the cellular interface attached to the UE.

Example 35 is the apparatus of any of Examples 26-33, where the processor is a baseband processor.

Example 36 is a computer program product including a computer-readable storage medium that stores instructions for execution by a processor to perform operations of a user equipment (UE) where the operations, when executed by the processor, perform a method. The method includes associating with an enhanced node B (eNB). The method includes associating with a wireless local area network (WLAN) access point (AP) attached to a WLAN termination (WT). The method includes enabling long term evolution wireless local area network aggregation (LWA) in the uplink (UL) with the eNB and WLAN AP. The method includes determining to split a bearer in the uplink (UL) between the eNB and the WT based on the LWA configuration. The method includes determining a split ratio between a long term evolution (LTE) transmissions with the eNB and WLAN transmissions with the WT, and scheduling data for transmission to the eNB and WT using the split bearer based at least in part on the split ratio.

Example 37 is the computer program product of Example 36, where the processor is further designed to generate a buffer status report for the eNB.

Example 38 is the computer program product of Example 37, where to generate a buffer status report further includes processing the data to send using the split bearer, determining a portion of the data to send to the eNB using a cellular interface, and generating the buffer status report including an indicator of the portion of data.

Example 39 is the computer program product of Example 37, where to generate a buffer status report further includes processing data to send using the split bearer, generating the buffer status report including an indicator of the total data, and processing an indicator of a traffic splitting decision from the eNB.

Example 40 is the computer program product of Example 37, where to generate a buffer status report further includes processing data to send using the split bearer, and generating the buffer status report including an indicator of the data to be sent over a first wireless channel to the eNB and over a second wireless channel to the WLAN AP.

Example 41 is the computer program product of Example 40, where to generate the buffer status report, including the indicator, further includes generating the indicator including a total data indicator and a percentage of the total data to send over the first wireless channel.

Example 42 is the computer program product of Example 40, where to generate the buffer status report, including the indicator, further includes generating the indicator including a first data indicator indicating a first portion of the data to send using the first wireless channel to the eNB and a second portion of the data to send using the second wireless channel to the WLAN AP.

Example 43 is the computer program product of Example 37, where to generate a buffer status report further includes process data to send using the split bearer and process a buffer status report threshold from the eNB. Processing a buffer status report threshold from the eNB includes transmitting at least a portion of the data over a second wireless channel to the WLAN AP, and when the data exceeds the buffer status report threshold, generating the buffer status report, including an indicator of the data to be sent over a first wireless channel to the eNB.

Example 44 is the computer program product of Example 37, where to generate a buffer status report also includes processing data to send using the split bearer and processing a buffer status report threshold from the eNB. And when the data is in a UE UL buffer and exceeds the buffer status report threshold, generating the buffer status report including an indicator of the data to be sent over a first wireless channel to the eNB.

Example 45 is the computer program product of Example 36, where the processor is further designed to split UL data between the eNB and the WLAN AP based on estimates on relative rate ratios, relative delays or congestion levels.

Example 46 is the computer program product of Example 36, where the processor is further designed to process an indicator from the eNB indicating a maximum rate to be transmitted on WLAN.

Example 47 is the computer program product of Example 36, where the processor is further designed to process an indicator from the eNB indicating a maximum ratio of data to be transmitted on WLAN.

Example 48 is a method for uplink bearer split using wireless local area network aggregation. The method includes associating with an enhanced node B (eNB), and associating with a wireless local area network (WLAN) access point (AP) attached to a WLAN termination (WT). The method further includes enabling long term evolution wireless local area network aggregation (LWA) in the uplink (UL) with the eNB and WLAN AP, and determining to split a bearer in the uplink (UL) between the eNB and the WT based on the LWA configuration. The method also includes determining a split ratio between a long term evolution (LTE) transmissions with the eNB and WLAN transmissions with the WT, and scheduling data for transmission to the eNB and WT using the split bearer based at least in part on the split ratio.

In Example 49, the method of claim 48, further includes generating the buffer status report for the eNB.

Example 50 is the method of claim 49, where generating the buffer status report further includes processing the data to send using the split bearer, determining a portion of the data to send to the eNB using a cellular interface, and generating the buffer status report including an indicator of the portion of data.

Example 51 is the method of claim 49, where generating the buffer status report further includes processing data to send using the split bearer, generating the buffer status report including an indicator of the total data, processing an indicator of a traffic splitting decision from the eNB.

Example 52 is the method of claim 49, where generating the buffer status report further includes processing data to send using the split bearer and generating the buffer status report to include an indicator of the data to be sent over a first wireless channel to the eNB and over a second wireless channel to the WLAN AP.

Example 53 is the method of claim 52, where generating the buffer status report includes the indicator further includes generating the indicator including a total data indicator and a percentage of the total data to send over the first wireless channel.

Example 54 is the method of claim 52, where generating the buffer status report includes the indicator further includes generating the indicator including a first data indicator indicating a first portion of the data to send using the first wireless channel to the eNB and a second portion of the data to send using the second wireless channel to the WLAN AP.

Example 55 is the method of claim 49, where generating the buffer status report further includes processing data to send using the split bearer, processing a buffer status report threshold from the eNB, and transmitting at least a portion of the data over a second wireless channel to the WLAN AP and when the data exceeds the buffer status report threshold, generating the buffer status report including an indicator of the data to be sent over a first wireless channel to the eNB.

Example 56 is the method of claim 49, where generating the buffer status report further includes processing data to send using the split bearer, processing a buffer status report threshold from the eNB; and when the data is in a UE UL buffer and exceeds the buffer status report threshold, generating the buffer status report including an indicator of the data to be sent over a first wireless channel to the eNB.

In Example 57, the method of claim 48, further including splitting UL data between the eNB and the WLAN AP based on estimates on relative rate ratios, relative delays or congestion levels.

In Example 58, the method of claim 48, further including processing an indicator from the eNB indicating a maximum rate to be transmitted on WLAN.

In Example 59, the method of claim 48, further including processing an indicator from the eNB indicating a maximum ratio of data to be transmitted on WLAN.

Example 60 is an apparatus including means to perform a method as claimed in any of claims 48-59.

Example 61 is a machine-readable storage including machine-readable instructions, when executed, to implement a method or realize an apparatus as claimed in any of claims 48-59.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station, RAN Node, etc.) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. An apparatus for use in a user equipment (UE), comprising:
storage configured to store a long term evolution wireless local area network aggregation (LWA) configuration; and
one or more processors configured to:
associate with a wireless wide area network (WWAN) base station;
associate with a wireless local area network (WLAN) access point (AP);
enable LWA in the uplink (UL) with the WWAN base station and WLAN AP;
determine to split a bearer in the UL between the WWAN base station and the WLAN AP based on the LWA configuration;
process an indicator received at the UE from the WWAN base station indicating a maximum ratio at which data may be transmitted on WLAN transmissions with the WLAN AP as compared to data transmitted on WWAN transmissions with the WWAN base station;
determine, based at least in part on the maximum ratio indicated by the WWAN base station, a split ratio for data to be transmitted on WLAN transmissions with the WLAN AP as compared to data to be transmitted on WWAN transmissions with the WWAN base station, wherein the split ratio is less than or equal to the maximum ratio; and
schedule data for transmission to the eNB and WLAN AP using the split bearer based at least in part on the split ratio.

2. The apparatus of claim 1, wherein to associate with the WWAN base station further comprises to establish an RRC connection.

3. The apparatus of claim 1, wherein the one or more processors are further configured to process a message from the WWAN base station configuring the split bearer in the UL.

4. The apparatus of claim 3, wherein the WWAN base station provides a threshold after which data will be split between a WWAN channel coupled to the WWAN base station and a WLAN channel coupled to the WLAN AP.

5. The apparatus of claim 1, wherein the one or more processors are further configured to split UL data between the WWAN base station and the WLAN AP based on estimates on relative rate ratios, relative delays or congestion levels.

6. The apparatus of claim 1, wherein the one or more processors are further configured to use WLAN procedures to indicate an amount of the data to be transmitted to a WLAN termination (WT) coupled to the WLAN AP.

7. The apparatus of claim 1, further comprising a UE WLAN interface coupled to the one or more processors and configured to communicate with a WLAN termination (WT) through the WLAN AP.

8. The system of claim 1, wherein the one or more processors includes a baseband processor.

9. An apparatus for use in a wireless wide area network (WWAN) base station, comprising:
storage for a long term evolution wireless local area network aggregation (LWA) configuration; and
one or more processors configured to:
associate with a user equipment (UE) through a UE WWAN interface;
determine that the UE is connected to a wireless local area network (WLAN) access point (AP) using a WLAN termination (WT), the WT coupled to the WWAN base station through a Xw interface;
generate a probability that the UE will send a transmission to the WLAN AP on a UE WLAN interface;
determine a bearer split for the UE over the UE WWAN interface and the UE WLAN interface based at least in part on the probability that the UE will send a transmission to the WLAN AP on the UE WLAN interface;
generate LWA configuration for the UE including the bearer split for the UE; and process messages from the UE data received over the UE WWAN interface and the Xw interface to form a single bearer.

10. The apparatus of claim 9, wherein the one or more processors are further configured to generate a threshold for the UE, when threshold is exceeded, the UE is configured to use both the UE WWAN interface and UE WLAN interface to send data in the uplink.

11. The apparatus of claim 9, wherein the one or more processors are further configured to generate a ratio indicating a portion of uplink (UL) data for the UE to send using the UE WWAN interface.

12. The apparatus of claim 9, wherein the one or more processors are configured to generate a UL grant for the UE WWAN interface to send a portion of data and a remainder of the data is configured to send over WLAN.

13. The apparatus of claim 9, wherein the one or more processors are configured to generate bearer split decisions based on link qualities, available traffic or quality of service requirements of a set of UEs associated with the WWAN base station.

14. The apparatus of claim 9, wherein the apparatus further comprises:
the Xw interface coupled to the WT; and
the UE WWAN interface coupled to the UE.

15. The apparatus of claim 9, wherein the one or more processors include a baseband processor.

16. A computer program product comprising a computer-readable storage medium that stores instructions for execution by a processor to perform operations of a user equipment (UE), the operations, when executed by the processor, to perform a method for uplink bearer split using wireless local area network aggregation, the method comprising:
associating with a wireless wide area network (WWAN) base station;
associating with a wireless local area network (WLAN) access point (AP) coupled to a WLAN termination (WT);
enabling long term evolution wireless local area network aggregation (LWA) in the uplink (UL) with the WWAN base station and WLAN AP;
determining to split a bearer in the uplink (UL) between the WWAN base station and the WT based on the LWA configuration;
processing an indicator received at the UE from the WWAN base station indicating a maximum ratio at which data may be transmitted on WLAN transmissions with the WLAN AP as compared to data transmitted on WWAN transmissions with the WWAN base station;
determining, based at least in part on the maximum ratio indicated by the WWAN base station, a split ratio for data to be transmitted on WLAN transmissions with the WLAN AP as compared to data to be transmitted on WWAN transmissions with the WWAN base station, wherein the split ratio is less than or equal to the maximum ratio; and
scheduling data for transmission to the WWAN base station and WT using the split bearer based at least in part on the split ratio.

17. The computer program product of claim 16, wherein the method further comprises generating a buffer status report for the WWAN base station.

18. The computer program product of claim 17, wherein generating the buffer status report further comprises:
processing the data to send using the split bearer;
determining a portion of the data to send to the WWAN base station using a UE WWAN interface; and
generating the buffer status report including an indicator of the portion of data.

19. The computer program product of claim 17, wherein generating the buffer status report further comprises:
processing data to send using the split bearer;
generating the buffer status report including an indicator of the total data; and
processing an indicator of a traffic splitting decision from the WWAN base station.

20. The computer program product of claim 17, wherein generating the buffer status report further comprises:
processing data to send using the split bearer; and
generating the buffer status report including an indicator of the data to be sent over a first wireless channel to the WWAN base station and over a second wireless channel to the WLAN AP.

21. The computer program product of claim 17, wherein generating the buffer status report further comprises:
processing data to send using the split bearer;
processing a buffer status report threshold from the WWAN base station; and
when the data is in a UE UL buffer and exceeds the buffer status report threshold, generating the buffer status report including an indicator of the data to be sent over a first wireless channel to the WWAN base station.

* * * * *